(12) United States Patent
Sato et al.

(10) Patent No.: US 10,176,730 B2
(45) Date of Patent: Jan. 8, 2019

(54) WINDING DEVICE AND LABEL PRINTING APPARATUS

(71) Applicant: FUJI XEROX CO., LTD., Tokyo (JP)

(72) Inventors: Kunihiko Sato, Ebina (JP); Kosuke Yamada, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/095,981

(22) Filed: Apr. 11, 2016

(65) Prior Publication Data

US 2017/0178545 A1 Jun. 22, 2017

(30) Foreign Application Priority Data

Dec. 18, 2015 (JP) ................................. 2015-247272

(51) Int. Cl.
| | |
|---|---|
| *B32B 38/10* | (2006.01) |
| *G09F 3/02* | (2006.01) |
| *B31D 1/02* | (2006.01) |
| *B32B 37/00* | (2006.01) |
| *B32B 37/20* | (2006.01) |

(Continued)

(52) U.S. Cl.
CPC ............... *G09F 3/02* (2013.01); *B31D 1/021* (2013.01); *B31D 1/026* (2013.01); *B31D 1/027* (2013.01); *B32B 37/0053* (2013.01); *B32B 37/20* (2013.01); *B32B 38/04* (2013.01); *B32B 38/10* (2013.01); *B32B 38/145* (2013.01); *B65H 18/26* (2013.01); *B65H 23/16* (2013.01); *B65H 23/1888* (2013.01); *B65H 35/00* (2013.01); *B65H 37/04* (2013.01); *G09F 3/10* (2013.01); *B32B 43/006* (2013.01); *B32B 2038/042* (2013.01); *B32B 2250/02* (2013.01); *B32B 2519/00* (2013.01); *B65H 2301/122* (2013.01); *B65H 2301/5163* (2013.01); *B65H 2301/51122* (2013.01); *B65H 2301/51538* (2013.01); *B65H 2701/192* (2013.01); *B65H 2701/194* (2013.01); *B65H 2801/15* (2013.01); *G09F 2003/0255* (2013.01); *G09F 2003/0257* (2013.01); *Y10T 156/1174* (2015.01); *Y10T 156/1195* (2015.01); *Y10T 156/195* (2015.01); *Y10T 156/1956* (2015.01); *Y10T 156/1994* (2015.01)

(58) Field of Classification Search
CPC . B32B 38/10; B32B 43/006; Y10T 156/1174; Y10T 156/1184; Y10T 156/1195; Y10T 156/195; Y10T 156/1956; Y10T 156/1967; Y10T 156/1994
USPC ........ 156/715, 717, 719, 759, 760, 762, 767
See application file for complete search history.

(56) References Cited

U.S. PATENT DOCUMENTS

| | | | | |
|---|---|---|---|---|
| 2,325,400 | A * | 7/1943 | Hoover | ............... B65H 35/0026 |
| | | | | 156/767 |
| 3,522,136 | A * | 7/1970 | McCormick | ........... B31D 1/021 |
| | | | | 156/384 |

(Continued)

FOREIGN PATENT DOCUMENTS

JP 2012-215608 A 11/2012

*Primary Examiner* — Mark A Osele
*Assistant Examiner* — Nickolas R Harm
(74) *Attorney, Agent, or Firm* — Oliff PLC

(57) ABSTRACT

A winding device includes: a separation unit that separates sheets layered and simultaneously transported; a winding unit that winds one of the sheets separated by the separation unit; and a pressure contact unit that presses the one of the sheets wound by the winding unit from outside of the wound sheet toward the winding unit.

9 Claims, 8 Drawing Sheets

(51) Int. Cl.
  *B32B 38/04* (2006.01)
  *B65H 18/26* (2006.01)
  *B65H 35/00* (2006.01)
  *B65H 37/04* (2006.01)
  *G09F 3/10* (2006.01)
  *B32B 38/00* (2006.01)
  *B65H 23/16* (2006.01)
  *B65H 23/188* (2006.01)
  *B32B 43/00* (2006.01)

(56) References Cited

U.S. PATENT DOCUMENTS

| | | | | |
|---|---|---|---|---|
| 4,246,058 A * | 1/1981 | Reed | ............... | B26D 7/1827 |
| | | | | 156/183 |
| 4,841,712 A * | 6/1989 | Roou | ............... | B65B 9/02 |
| | | | | 156/248 |
| 5,191,693 A * | 3/1993 | Umetsu | ............... | B23P 19/001 |
| | | | | 156/324 |
| 5,405,475 A * | 4/1995 | Kraft | ............... | B32B 37/0038 |
| | | | | 156/275.5 |
| 5,624,520 A * | 4/1997 | Nedblake | ............... | G09F 3/10 |
| | | | | 156/152 |
| 6,174,402 B1 * | 1/2001 | Nakano | ............... | B31D 1/021 |
| | | | | 156/247 |
| 6,902,643 B2 * | 6/2005 | Arcaro | ............... | B41J 2/325 |
| | | | | 156/247 |
| 7,236,093 B2 * | 6/2007 | Stromberg | ............... | G06K 19/041 |
| | | | | 283/81 |
| 7,753,097 B2 * | 7/2010 | Dangami | ............... | B31D 1/021 |
| | | | | 156/378 |
| 9,174,756 B2 * | 11/2015 | Izawa | ............... | B65C 9/0006 |
| 2002/0108709 A1 * | 8/2002 | Fukada | ............... | B65H 23/32 |
| | | | | 156/719 |
| 2002/0124948 A1 * | 9/2002 | Mikkelsen | ............... | B08B 7/0028 |
| | | | | 156/247 |
| 2004/0161573 A1 * | 8/2004 | Bethune | ............... | B31D 1/021 |
| | | | | 428/42.3 |
| 2006/0233995 A1 * | 10/2006 | Garland | ............... | B31D 1/021 |
| | | | | 428/41.8 |
| 2014/0299278 A1 * | 10/2014 | Previty | ............... | B32B 43/006 |
| | | | | 156/719 |
| 2015/0075708 A1 * | 3/2015 | Boedeker | ............... | B32B 37/02 |
| | | | | 156/247 |

\* cited by examiner

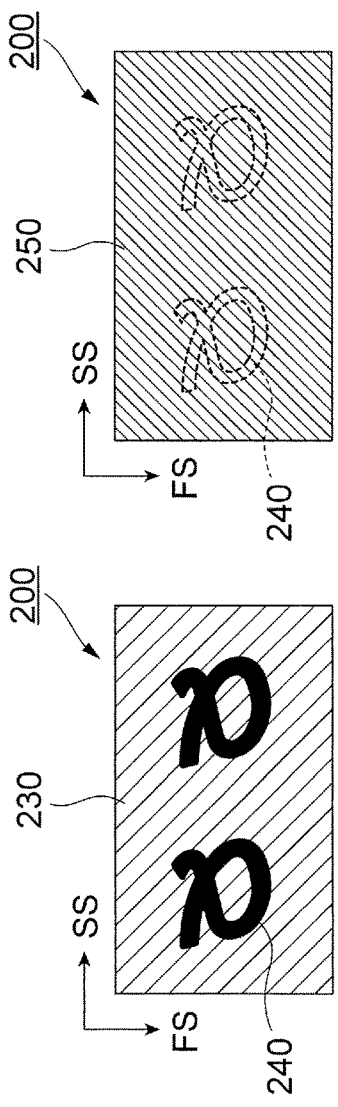
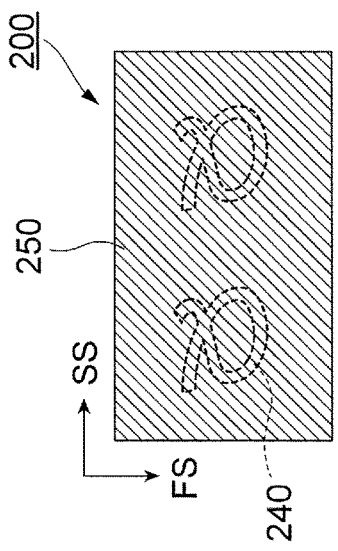
FIG. 3A
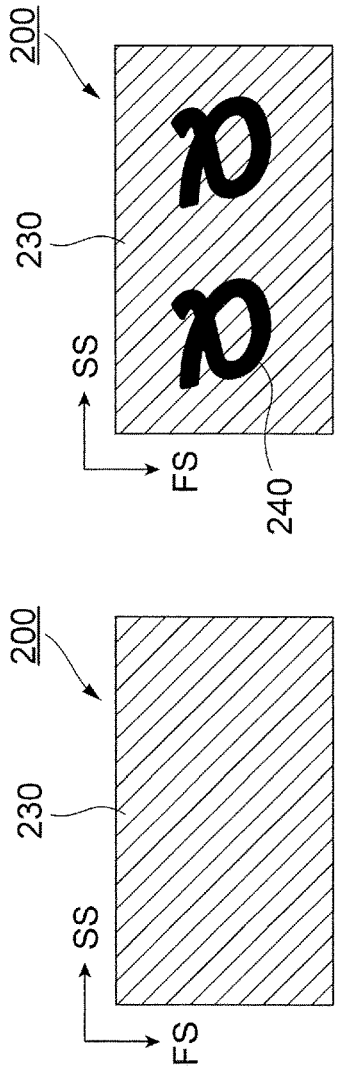
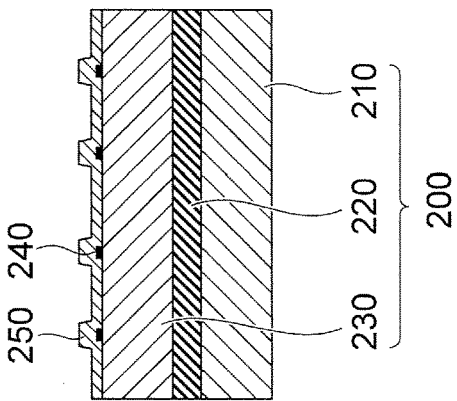
FIG. 3B
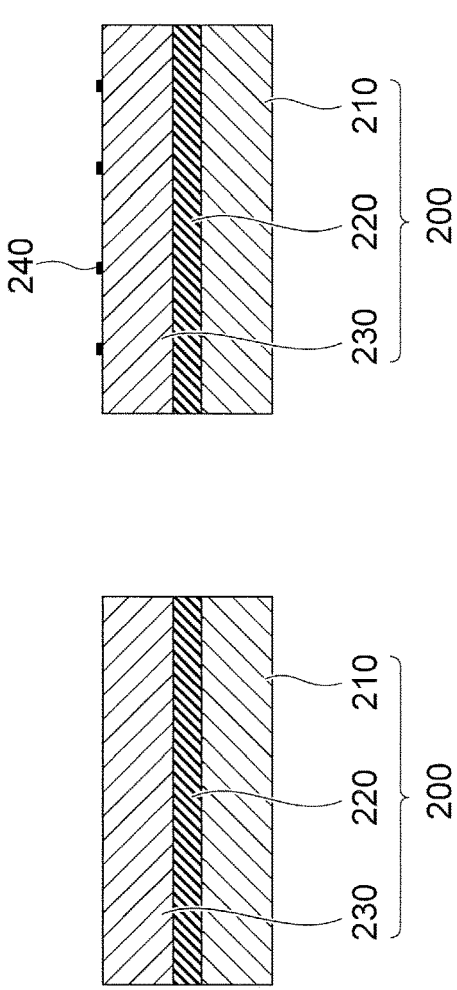
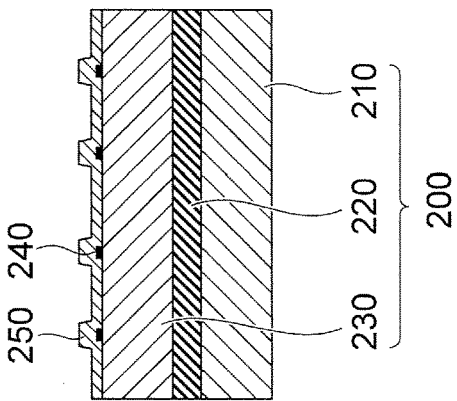
FIG. 3C

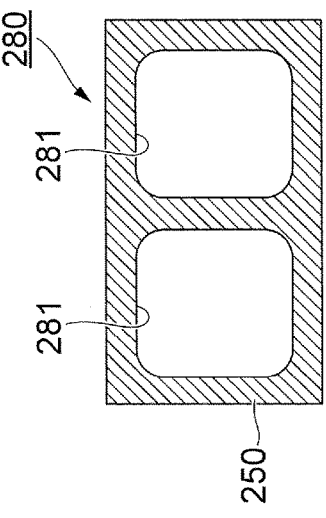
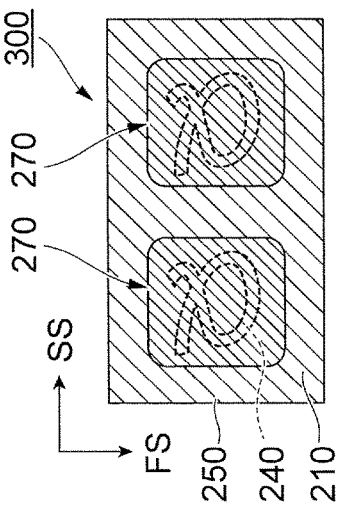
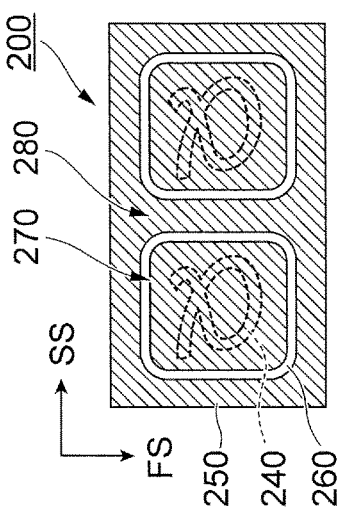
FIG.3D  FIG.3E  FIG.3F
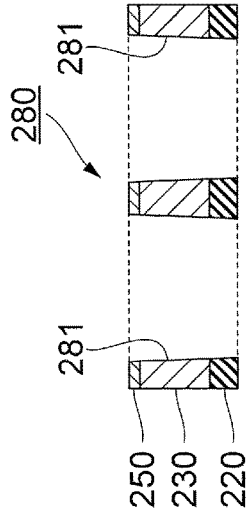
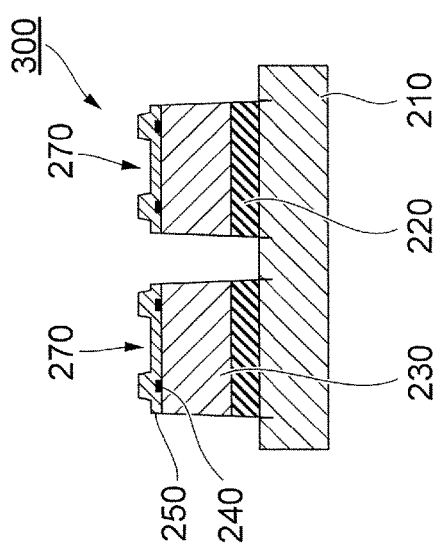
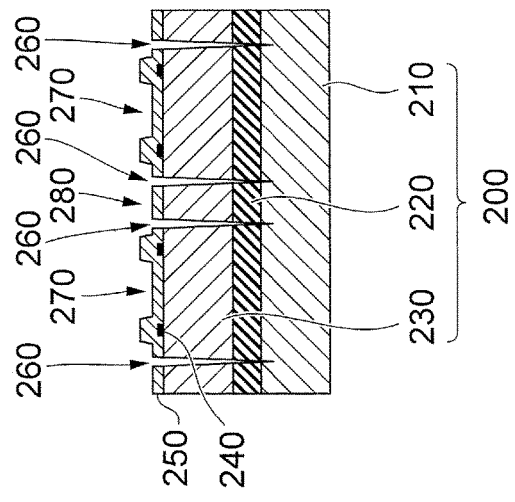

WINDING DEVICE AND LABEL PRINTING APPARATUS

CROSS REFERENCE TO RELATED APPLICATION

This application is based on and claims priority under 35 USC § 119 from Japanese Patent Application No. 2015-247272 filed Dec. 18, 2015.

BACKGROUND

Technical Field

The present invention relates to a winding device and a label printing apparatus.

Related Art

In recent years, techniques for preventing deformation in label sheets in forming the label sheets have been suggested.

SUMMARY

According to an aspect of the present invention, a winding device includes: a separation unit that separates sheets layered and simultaneously transported; a winding unit that winds one of the sheets separated by the separation unit; and a pressure contact unit that presses the one of the sheets wound by the winding unit from outside of the wound sheet toward the winding unit.

BRIEF DESCRIPTION OF THE DRAWINGS

An exemplary embodiment of the present invention will be described in detail based on the following figures, wherein:

FIGS. 3A to 3C are diagrams for illustrating label forming procedures in the exemplary embodiment. FIG. 3A is a diagram illustrating a configuration of the label base material, FIG. 3B is a diagram illustrating a state after an image is formed on the label base material in FIG. 3A, and FIG. 3C is a diagram illustrating a state after lamination is applied onto the image formed on the label base material in FIG. 3B;

FIGS. 3D to 3F are also diagrams for illustrating label forming procedures in the exemplary embodiment. FIG. 3D is a diagram illustrating a state after the label base material in FIG. 3C is diced, FIG. 3E is a diagram illustrating a configuration of a label-group sheet after residues are peeled off, and FIG. 3F is a diagram illustrating a configuration of the peeled residue;

DETAILED DESCRIPTION

Hereinafter, an exemplary embodiment according to the present invention will be described in detail with reference to attached drawings.

<Configuration of Label Printing Apparatus 1>

Figure 1:
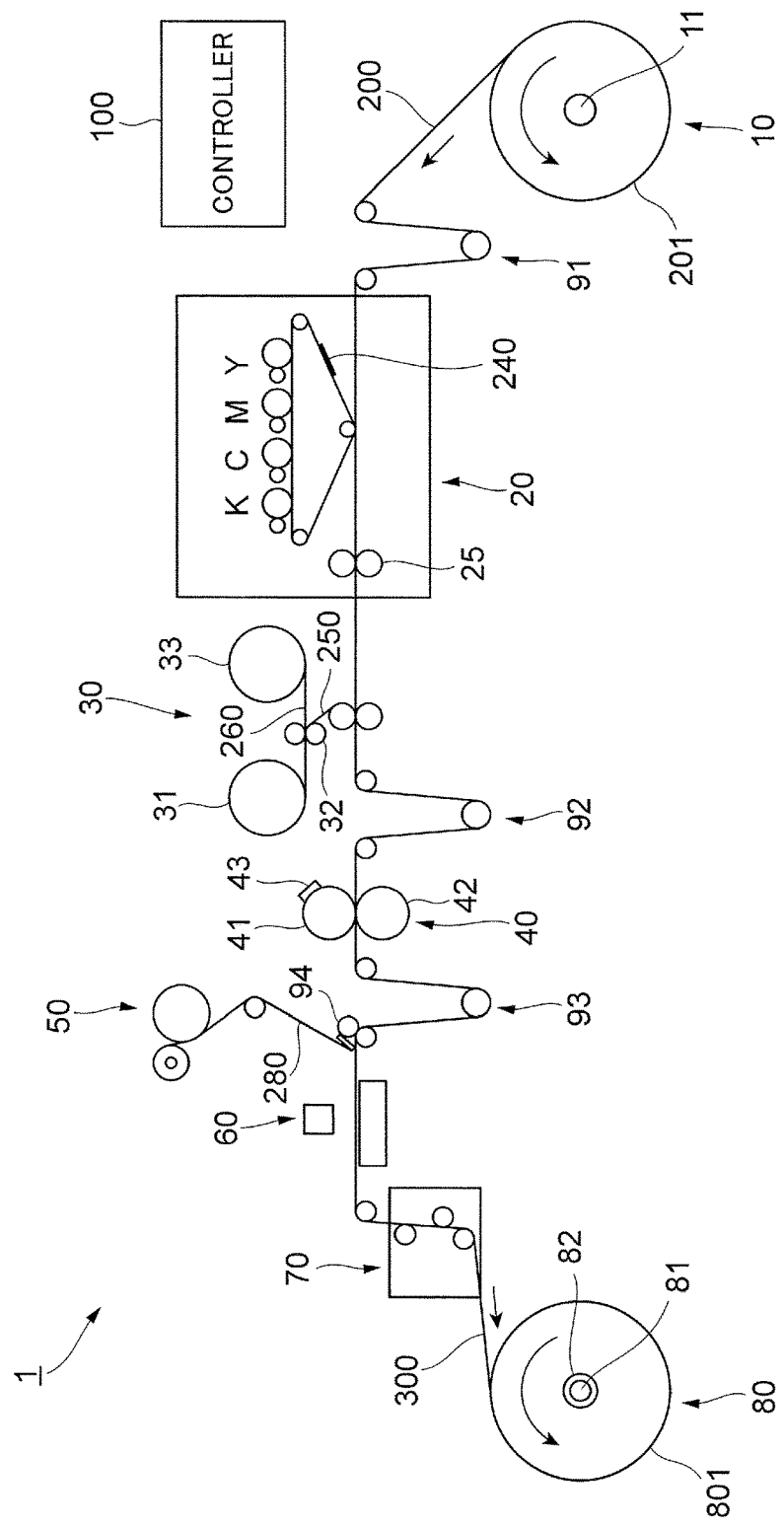
FIG. 1 is a diagram showing an overall configuration of a label printing apparatus in the exemplary embodiment.

First, with reference to FIG. 1, a configuration of a label printing apparatus 1 in the exemplary embodiment will be described. Note that FIG. 1 is a diagram showing an overall configuration of the label printing apparatus 1 in the exemplary embodiment.

The label printing apparatus 1 includes: a forwarding part 10 that forwards a label base material 200 which is a band-shaped sheet; an image forming part 20 that forms an image on the label base material 200; a lamination part 30 that pastes a laminate film 250 on a surface of the label base material 200 after the image has been formed (image formation surface); a punching part 40 that punches predetermined shapes in the label base material 200 having been laminated to form labels 270 (to be described later); a residue wind-up part 50 that winds a residue 280, which is an unnecessary part in a rim of the labels 270; an inspection part 60 that makes an inspection of quality of the labels 270 on a label-group sheet 300 (to be described later) from which the residue 280 has been wound off; a defective label peeling part 70 that peels off a defective label 270 from the label base material 200; and a winding part 80 that winds up the label-group sheet 300.

Moreover, the label printing apparatus 1 includes: a first buffering part 91, a second buffering part 92 and a third buffering part 93 that adjust tension of the label base material 200; a transport unit 94 that transports the label base material 200; and a controller 100 that controls each functional configuration member of the label printing apparatus 1.

Note that the label printing apparatus 1 includes a housing 90 (refer to FIG. 4, which will be described later) that supports each functional configuration member described above.

Hereinafter, each functional configuration member of the label printing apparatus 1 will be described in order.

<Forwarding Part 10>

The forwarding part 10 has a forwarding roll 11 that is rotated upon receiving a driving force. On a perimeter of the forwarding roll 11, a supply label roll 201, in which the label base material 200 is wound in a roll shape, is mounted.

When the forwarding roll 11 is rotated, the band-shaped label base material 200 (continuous sheet) is forwarded from the supply label roll 201. Note that, in the following description, the transport direction of the label base material 200 due to the rotation of the forwarding roll 11 is referred to as "main transport direction" in some cases.

<Image Forming Part 20>

The image forming part 20 forms a print image 240 on a surface of the label base material 200 by, for example, an electrophotographic system or an ink-jet system.

In the image forming part 20 in the specific example shown in the figure, the print image 240 is formed by toner images of yellow (Y), magenta (M), cyan (C) and black (K). Moreover, the print image 240 formed on the label base material 200 is heated and pressurized in a fixing part 25 to be fixed onto the label base material 200.

<Lamination Part 30>

The lamination part 30, which is an example of a lamination unit, includes, in the specific example shown in the figure: a laminate film wind-off part 31 that winds off a laminate film (film) wound in a roll shape into a band shape; a laminator part 32 that layers the laminate film that has been wound off on the label base material 200; and a laminate film residue winding part 33 that winds up film residue of the laminate film.

Here, on one of the surfaces of the laminate film 250, an adhesive (not shown) is applied. The laminate film 250 is wound off from the laminate film wind-off part 31 so that the surface on the adhesive side of the laminate film 250 faces the label base material 200. The laminate film 250 having been wound off is layered on the surface of the label base material 200, on which the print image 240 is formed, and pressurized by the laminator part 32.

Consequently, the laminate film 250 is pressure-bonded to the label base material 200 in an integrated manner to cover the print image 240.

<Punching Part 40>

The punching part 40 includes: a first roll 41 and a second roll 42 arranged to face each other with the laminate film 250 interposed therebetween; and a die plate 43 that is detachably attached to the first roll 41.

The die plate 43 is a so-called die and includes blades of a shape corresponding to the labels 270. The labels 270 are punched by pressing the blades of the die plate 43 against the laminate film 250.

Note that, though illustration is omitted, plural die plates 43 are provided to the first roll 41. The shapes of the blades of the respective die plates 43 are different from one another, and one of the die plates 43 is selected in accordance with the shape of the labels 270 to be formed.

<Residue Wind-Up Part 50>

The residue wind-up part 50 peels off the residue 280 positioned around the labels 270 having been punched by the punching part 40 from the label base material 200. Note that the residue 280 is an example of a label-excluding portion. Moreover, details of the residue wind-up part 50 will be described separately.

<Inspection Part 60>

The inspection part 60 carries out inspection of quality of the labels 270 having been formed. In the inspection part 60 shown in the figure, while the shape of the labels 270 is recognized by an image sensor (not shown), presence or absence of defects in the labels 270, for example, whether the shape of the labels 270 falls within a predetermined range, is determined.

The inspection part 60 outputs a signal based on the inspection result to the controller 100. Note that, in accordance with the signal from the inspection part 60, the controller 100 switches the output signal to the defective label peeling part 70.

<Defective Label Peeling Part 70>

Based on the signal from the controller 100, the defective label peeling part 70 removes the label 270 that has been determined to be defective from the label base material 200.

Specifically, when the inspection result from the inspection part 60 indicates a non-defective item, namely, a good item, the defective label peeling part 70 allows the label base material 200 to go through without being processed. On the other hand, when the inspection result from the inspection part 60 indicates a defective item, the defective label peeling part 70 peels off the label 270 from the label base material 200.

<Winding Part 80>

The winding part 80 includes a winding roll 81 that is rotated upon receiving a driving force and a paper core 82 that is detachably attached to the winding roll 81. Then, with rotation of the paper core 82 together with the winding roll 81, the label base material 200 is wound around the periphery of the paper core 82, to thereby form a wound-up label roll 801. Note that, after winding is completed by the winding part 80, the paper core 82 is removed together with the wound-up label roll 801 from the winding roll 81.

<Label Base Material 200>

Figure 2:
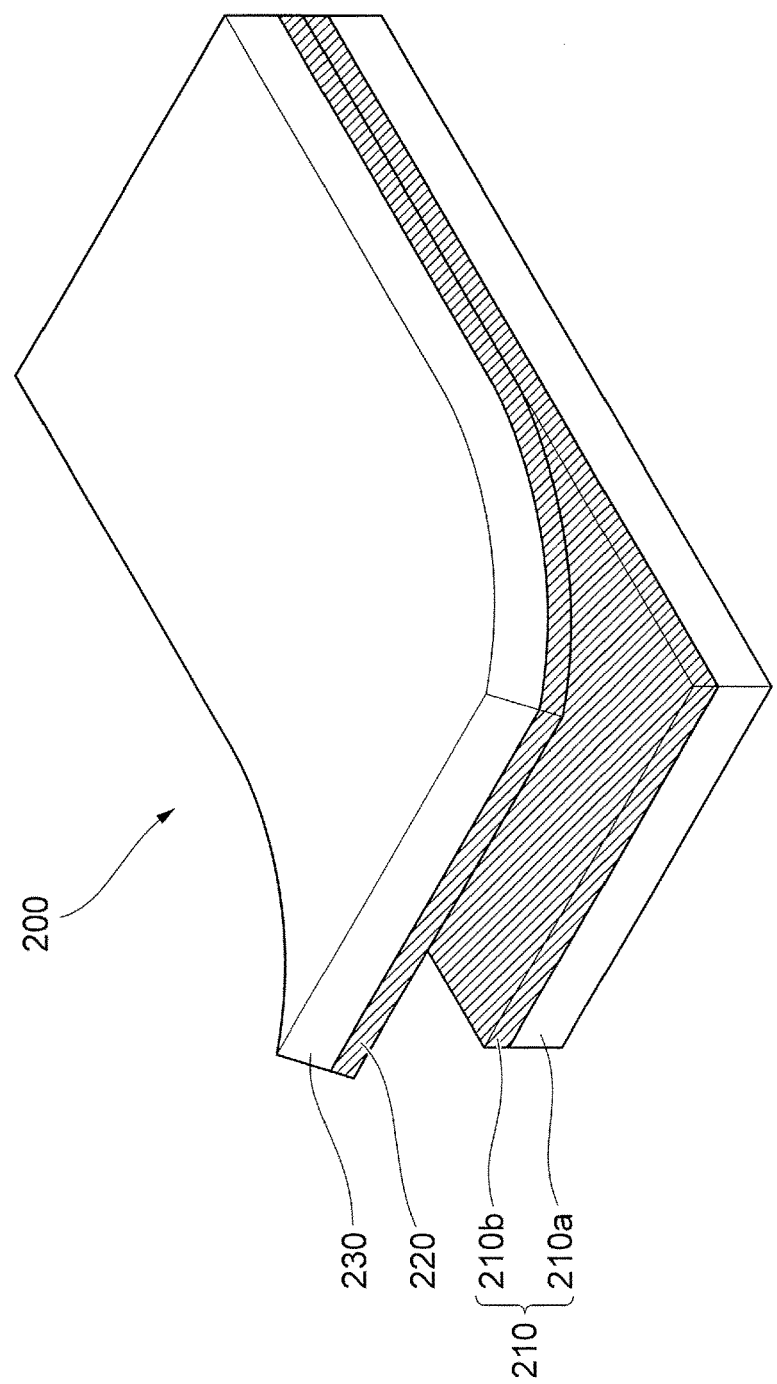
FIG. 2 is a cross-sectional view showing a configuration of a label base material in the exemplary embodiment.

FIG. 2 is a cross-sectional view showing a configuration of the label base material 200 in the exemplary embodiment.

Next, with reference to FIG. 2, the label base material 200, which is subject to a process by the label printing apparatus 1, will be described. The label base material 200, which is an example of a two-ply sheet, is a band-shaped member and includes plural layers. Specifically, the label base material 200 includes a separator 210, an adhesive 220 and a base material 230.

The separator 210 is a so-called mount paper, and is a member to be peeled off when the label 270 is used. The separator 210 includes a peeling base sheet 210a that is a band-shaped member formed of resin or paper and a peeling material 210b formed of silicone or the like and laminated on a surface of the peeling base sheet 210a.

The adhesive 220 is formed of resin containing rubber or the like, and laminated between the separator 210 and the base material 230.

The base material 230, which is an example of a seal sheet, is a member constituting a part of the label 270. The base material 230 is a band-shape member formed of resin or paper.

Note that, in the specific example shown in FIG. 1, in the supply label roll 201 (refer to FIG. 1) mounted onto the forwarding part 10, the label base material 200 is wound so that the separator 210 faces inward in the radial direction and the base material 230 faces outward in the radial direction.

<Operations of Label Printing Apparatus 1>

FIGS. 3A to 3C and 3D to 3F are diagrams for illustrating procedures for forming the labels 270 in the exemplary embodiment.

Next, with reference to FIGS. 1 to 3F, operations of the label printing apparatus 1 in the exemplary embodiment will be described.

Upon receiving a rotation control signal from the controller 100, the forwarding roll 11 in the forwarding part 10 is rotated, and thereby the label base material 200 is forwarded. As shown in FIG. 3A, in the label base material 200 to be forwarded, the separator 210, the adhesive 220 and the base material 230 are laminated.

Next, on a surface of the label base material 200 that has been forwarded, the print image 240 is formed (refer to FIG. 3B) in the image forming part 20.

Then, in the lamination part 30, the laminate film 250 is pasted on the surface of the label base material 200 after image formation (refer to FIG. 3C). In other words, the print image 240 is covered with the laminate film 250.

Next, in the label base material 200 having been laminated, predetermined shapes (in the specific example shown in the figure, substantially rectangles) are punched in the punching part 40. At this time, grooves 260 of a predetermined shape are formed in the label base material 200 (refer to FIG. 3D).

Here, in the laminate film 250, the base material 230 and the adhesive 220 of the label base material 200, the grooves 260 are formed to penetrate the entire thickness thereof, whereas, in the separator 210, the grooves 260 are formed in a part of the thickness thereof (in a part on a side facing the adhesive 220), and the other part of the separator 210 is continued in the longitudinal direction.

Moreover, the laminate film 250, the base material 230 and the adhesive 220 having been punched in the predetermined shapes constitute the labels 270. In addition, as the label base material 200 is viewed in a planar view, the portions positioned around the punched labels 270 become the residue 280.

Next, from the label base material 200 on which the labels 270 are formed, the residue 280 is removed by the residue wind-up part 50 (refer to FIG. 3E). The label base material 200 from which the residue 280 has been removed constitutes the label-group sheet 300. Note that the label-group sheet 300 has plural labels 270 arranged on the surface of the separator 210 being separated from one another.

Next, quality of the labels 270 of the label-group sheet 300 is inspected by the inspection part 60. The defective label 270 is peeled off from the label-group sheet 300 by the defective label peeling part 70. Then, the label-group sheet 300 including the labels 270 left without being peeled off by the defective label peeling part 70 is wound by the winding part 80.

Here, with reference to FIG. 3F, the residue 280 will be described. The residue 280 is in the band shape, and similar to the label 270 (refer to FIG. 3E), configured with the laminate film 250, the base material 230 and the adhesive 220.

Moreover, the residue 280 has a non-continuous portion in the longitudinal direction (the SS direction in the figure) and the direction intersecting the longitudinal direction (the FS direction in the figure) of the label base material 200. In other words, the residue 280 is in a shape having through holes (cuttings) 281. Note that the label base material 200 in the specific example shown in the figure has plural through holes 281 arranged in the longitudinal direction with constant pitches.

<Residue Wind-Up Part 50>

Figure 4:
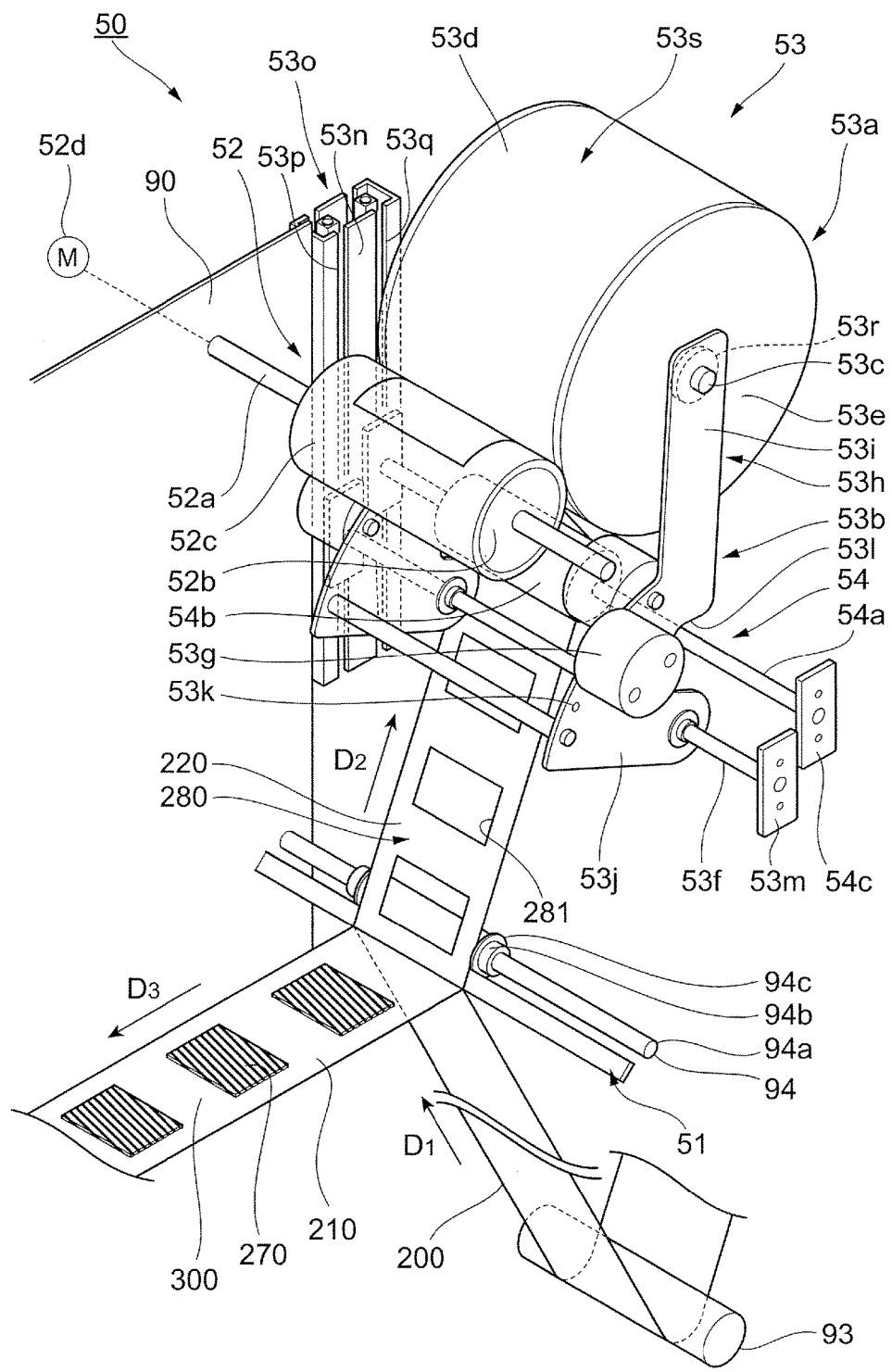
FIG. 4 is a schematic configuration view of a residue wind-up part in the exemplary embodiment.

FIG. 4 is a schematic configuration view of the residue wind-up part 50 in the exemplary embodiment.

Here, with reference to FIG. 4, the residue wind-up part 50 will be described.

The residue wind-up part 50, which is an example of a winding unit, includes: a peeling part 51 that guides peeling of the residue 280 from the label base material 200; a winding unit 52 that winds up the residue 280 that has been peeled off by the peeling part 51; a guide unit 53 that presses and flattens the residue 280 to be wound by the winding unit 52; and an angle adjusting unit 54 that adjusts a wind-up angle of the residue 280 to be wound by the winding unit 52.

Note that, in the following description, the transport direction of the label base material 200 between the third buffering part 93 and the peeling part 51 (refer to D1 in the figure) is referred to as "label base material transport direction", the transport direction of the peeled residue 280 (refer to D2 in the figure) is referred to as "residue transport direction", and the transport direction of the label-group sheet from which the residue 280 has been peeled off (refer to D3 in the figure) is referred to as "label-group sheet transport direction" in some cases.

Moreover, as shown in FIG. 4, the peeling part 51, the angle adjusting unit 54, the guide unit 53 and the winding unit 52 are aligned in this order along the residue transport direction D2.

Note that the peeling part 51 serves as a starting point of the residue transport direction D2, and the winding unit 52 serves as an ending point of the residue transport direction D2.

<Peeling Part 51>

The peeling part 51, which is an example of a separation unit and a separation section, is a member like a thin plate, and configured with, for example, metal or resin. In the specific example shown in the figure, the peeling part 51 is of long lengths, and is wider than the width of the residue 280 in the longitudinal direction thereof.

Moreover, one end of the peeling part 51 is secured to the housing 90, and the other end is a free end.

A tip end of the peeling part 51 is pressed against the laminate film 250 that is pressure-bonded to the label base material 200. Moreover, the peeling part 51 is arranged at an inclination with respect to the label base material 200 in the label base material transport direction D1.

<Winding Unit 52>

The winding unit 52, which is an example of a winding unit and a winding body, includes: a winding roll shaft 52*a*; a winding roll main body 52*b* provided integrally with the winding roll shaft 52*a*; a paper core 52*c* attached to the winding roll main body 52*b*; and a motor 52*d* that provides a driving force to the winding roll shaft 52*a*.

The winding roll shaft 52*a* is substantially a columnar member, and configured with, for example, a metal rod. Moreover, one end of the winding roll shaft 52*a* in the axial direction is rotatably supported by the housing 90 and the other end is a free end.

Note that the axial direction of the winding roll shaft 52*a* shown in FIG. 4 is simply referred to as "axial direction", and the radial direction of the winding roll shaft 52*a* is simply referred to as "radial direction" in some cases.

The winding roll main body 52*b* is arranged coaxially with the winding roll shaft 52*a* and secured to the winding roll shaft 52*a*.

In the winding roll main body 52*b*, the length in the axial direction is longer than the width of the residue 280 and shorter than the winding roll shaft 52*a*. Moreover, the outer diameter of the winding roll main body 52*b* is larger than the outer diameter of the winding roll shaft 52*a*.

The inner diameter of the paper core 52*c* is smaller than the outer diameter of the winding roll main body 52*b*. The paper core 52*c* is inserted from the free-end side of the winding roll shaft 52*a*, and pressed to fit over the winding roll main body 52*b* to be secured.

Note that, when the residue 280 of a predetermined amount (length) is wound around the paper core 52*c*, the paper core 52*c* is removed together with the residue 280. Then, a new paper core 52*c* is attached to the winding roll main body 52*b*.

The motor 52*d* supplies the driving force to the winding roll main body 52*b*. The motor 52*d* is controlled by the controller 100 (refer to FIG. 1).

Here, the winding roll shaft 52*a* is rotated due to the drive of the motor 52*d* upon receiving the rotation control signal from the controller 100. With the rotation of the winding roll shaft 52*a*, the paper core 52*c* provided to the winding roll main body 52*b* is rotated.

<Guide Unit 53>

Figure 5:
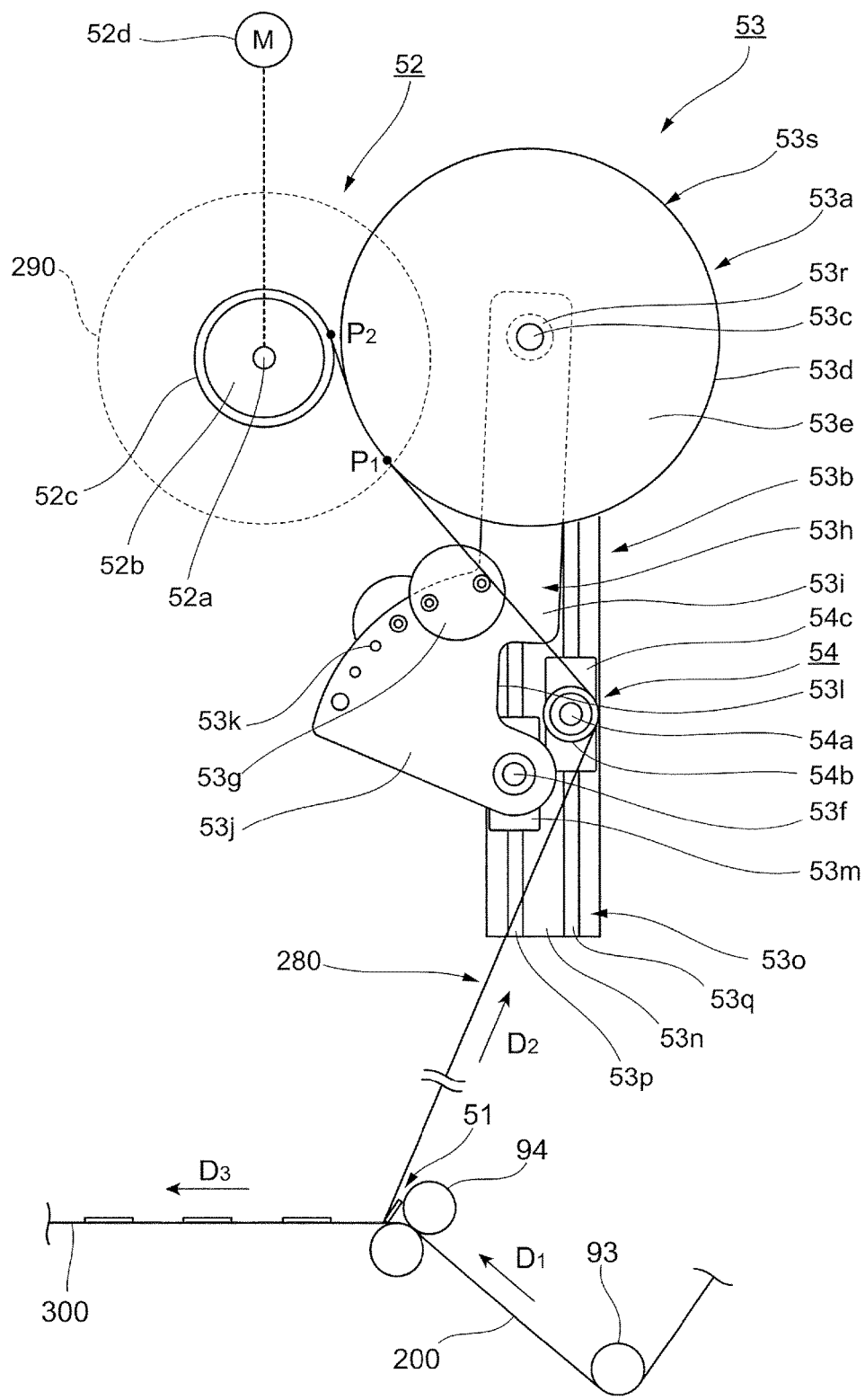
FIG. 5 is a diagram for illustrating a configuration of a winding unit in the exemplary embodiment.

FIG. 5 is a diagram for illustrating a configuration of the winding unit 52 in the exemplary embodiment.

Next, with reference to FIGS. 4 and 5, a configuration of the guide unit 53 in the exemplary embodiment will be described.

The guide unit 53, which is an example of a pressure contact unit and a pressure contact section, includes a guide roll part 53*a* that is pressed against the residue 280 and a support body part 53*b* that supports the guide roll part 53*a* in a displaceable manner.

Note that, though details will be described later, in the guide unit 53 in the exemplary embodiment, the guide roll part 53*a* is displaced with variation in attitude of the support body parts 53*b*. Moreover, the guide unit 53 does not have a driving source of its own, and accordingly, the guide unit 53 is pressed against the residue 280 and rotated to follow the residue 280 being transported.

<Guide Roll Part 53a>

The guide roll part 53a includes: a guide roll shaft 53c; a guide roll main body part 53s attached to the guide roll shaft 53c to be rotated; and guide roll bearings 53r that rotatably support the guide roll main body part 53s around the guide roll shaft 53c.

The guide roll shaft 53c is substantially a columnar member, and configured with, for example, a metal.

The guide roll main body part 53s includes a guide roll main body 53d and guide roll side plates 53e.

The guide roll main body 53d is substantially a cylindrical member, and configured with, for example, a metal, such as aluminum, or resin. The length of the guide roll main body 53d in the axial direction is longer than the width of the residue 280. Moreover, the outer diameter of the guide roll main body 53d is larger than the outer diameter of the paper core 52c.

The guide roll side plate 53e is substantially a disc-like member, and configured with, for example, a metal.

The guide roll main body part 53s is configured by securing the guide roll side plates 53e to both ends of the guide roll main body 53d in the axial direction.

The guide roll bearings 53r are configured with, for example, ball bearings. The guide roll bearings 53r are provided to the periphery of the guide roll shaft 53c to support the guide roll side plates 53e.

<Support Body Part 53b>

Each of the support body parts 53b includes: a support body arm 53h; a support body shaft 53f that serves as a rotational center of the support body arm 53h; a weight 53g capable of adjusting a position thereof with respect to the support body arm 53h; and a securing part 53o that secures the support body shaft 53f to the housing 90.

The support body arm 53h is a plate-like member and made of, for example, a metal. One support body arm 53h is provided to each of both ends of the guide roll shaft 53c in the guide roll part 53a. Moreover, each support body arm 53h supports the guide roll shaft 53c.

The support body shaft 53f rotatably supports each of the support body arms 53h. Moreover, the support body shaft 53f shown in the figure couples the pair of support body arms 53h.

The weight 53g is a block-like member, and configured with, for example, a metal. The weight 53g is secured to the support body arm 53h. The weight 53g provides a pressing force (guide unit pressure) for pressing the guide roll part 53a against the winding unit 52.

The securing part 53o includes a securing part main body 53n to be secured to the housing 90 and securing part plates 53m to be secured to both ends of the support body shaft 53f.

The securing part main body 53n is a member in a rectangular-parallelepiped shape, and is configured with, for example, a metal.

Moreover, the securing part main body 53n includes a securing part first groove 53p and a securing part second groove 53q. These are the grooves that are substantially linear. The securing part first groove 53p and the securing part second groove 53q in the specific example shown in the figure are formed side by side with each other.

The securing section plate 53m is a plate-like member, and is configured with, for example, a metal. The securing part plate 53m can slide along the securing part first groove 53p, and a position thereof is able to be secured within the securing part first groove 53p.

Note that, by changing the secured position of the securing part plate 53m within the securing part first groove 53p, the attachment position of the guide unit 53 with respect to the housing 90 is changed.

The guide unit 53 configured as described above is rotated around the support body shaft 53f. With the rotation, a distance between the rotational center of the winding unit 52 and the rotational center of the guide roll part 53a is varied. In other words, the guide roll part 53a moves closer or farther to or from the winding unit 52.

<Support Body Arm 53h>

Here, with reference to FIGS. 4 and 5, a detailed configuration of the support body arm 53h will be described.

The support body arm 53h includes: a support body arm main body part 53i; a support body arm convex part 53j that is formed integrally with the support body arm main body part 53i; support body arm adjusting holes 53k provided to the support body arm main body part 53i and the support body arm convex part 53j; and a support body arm concave part 53l provided to the support body arm main body part 53i.

The support body arm main body part 53i is a portion of long lengths. The support body shaft 53f is provided to one end portion of the support body arm main body part 53i, and the guide roll shaft 53c of the guide roll part 53a is provided to the other end portion of the support body arm main body part 53i.

The support body arm convex part 53j is a portion protruding from a side surface of the support body arm main body part 53i toward the width direction of the support body arm main body part 53i.

The support body arm adjusting hole 53k is a through hole formed in the support body arm main body part 53i and the support body arm convex part 53j. The plural support body arm adjusting holes 53k are provided along a circumferential direction of the support body shaft 53f (in the specific example shown in the figure, six).

To the support body arm adjusting hole 53k, the weight 53g is secured by, for example, an attachment pin (not shown), such as a metal bolt. Depending on which of the plural support body arm adjusting holes 53k is used for securing the weight 53g, the pressing force for pressing the guide roll part 53a against the winding unit 52 is changed.

The support body arm concave part 53l is a concave portion (cutout) formed in the support body arm main body part 53i. The support body arm concave part 53l is a mechanism that prevents the support body arm main body part 53i rotating around the support body shaft 53f from interfering with the angle adjusting unit 54.

<Angle Adjusting Unit 54>

Next, with reference to FIGS. 4 and 5, a configuration of the angle adjusting unit 54 in the exemplary embodiment will be described.

The angle adjusting unit 54, which is an example of an upstream side pressure contact unit, includes: an adjusting part shaft 54a; an angle adjusting roll main body 54b that is attached to the adjusting part shaft 54a and rotated; and adjusting part securing plates 54c that adjust attachment position of the angle adjusting unit 54.

The angle adjusting unit 54 adjusts the angle between the label base material transport direction D1 and the residue transport direction D2.

The adjusting part shaft 54a is substantially a columnar member, and configured with, for example, a metal.

The angle adjusting roll main body 54b is substantially a circular-cylindrical member, and a surface thereof is formed of a material to which the adhesive is less likely to stick, for example, silicone.

Moreover, the length of the angle adjusting roll main body 54b in the axial direction is longer than the width of the residue 280 and shorter than the adjusting part shaft 54a.

Note that, against the outer circumferential surface of the angle adjusting roll main body 54b, the surface of the residue 280 on which the adhesive 220 is applied is pressed. Moreover, the angle adjusting roll main body 54b provides tension to the residue 280.

The adjusting part securing plate 54c is a plate-like member, and is configured with, for example, a metal. The adjusting part securing plate 54c is able to slide and be secured within the securing part second groove 53q of the support body part 53b.

The angle adjusting unit 54 configured as described above bends the transport route of the residue 280 while winding the residue 280. In other words, with the angle adjusting unit 54 as a boundary, the transport route of the residue 280 is divided into an upstream portion heading from the peeling part 51 toward the angle adjusting unit 54 and a downstream portion, which is in a direction different from the direction of the upstream portion, heading from the angle adjusting unit 54 toward the winding unit 52.

Moreover, the angle adjusting unit 54 adjusts the angle between the transport direction in the upstream portion in the residue transport direction D2 and the label base material transport direction D1, to thereby maintain a constant angle. Upon receiving a tension by the angle adjusting unit 54, the residue 280 is transported toward the winding unit 52 without loosening.

<Operations of Residue Wind-Up Part 50>

Subsequently, operations of the residue wind-up part 50 in the exemplary embodiment will be described.

Hereinafter, description will be given of a preparation step for starting the operation of winding up the residue 280, a winding step by the residue wind-up part 50, and a replacing step for the paper core 52c after the residue 280 is wound.

<Preparation Step>

First, with reference to FIGS. 4 and 5, operations in the preparation step of the residue wind-up part 50 in the exemplary embodiment will be described. Note that, when the preparation step is started, it is assumed that the guide roll part 53a is held at a position away from the winding unit 52.

First, the paper core 52c is attached to the winding roll main body 52b. Next, the residue 280 is connected to the paper core 52c.

Specifically, the residue 280 is peeled off from the label base material 200 that is wound off from the forwarding part 10 (refer to FIG. 1). Then, after the tip end of the residue 280 is fitted over the outer circumference of the angle adjusting roll main body 54b, the tip end is passed through between the paper core 52c and the guide roll main body 53d. Next, while the surface on the adhesive 220 side of the residue 280 is pressed against the paper core 52c, the tip end of the residue 280 is secured to the paper core 52c. Note that, for example, a tape material (not shown) may be used for securing the residue 280 to the paper core 52c.

Then, the guide roll part 53a held at a position away from the winding unit 52 is returned to a free state. This causes the guide roll part 53a to be urged by the weight 53g and pressed against the paper core 52c via the residue 280.

<Winding Step>

Next, with reference to FIGS. 6 and 7, operations in the winding step of the residue wind-up part 50 in the exemplary embodiment will be described.

Figure 6:
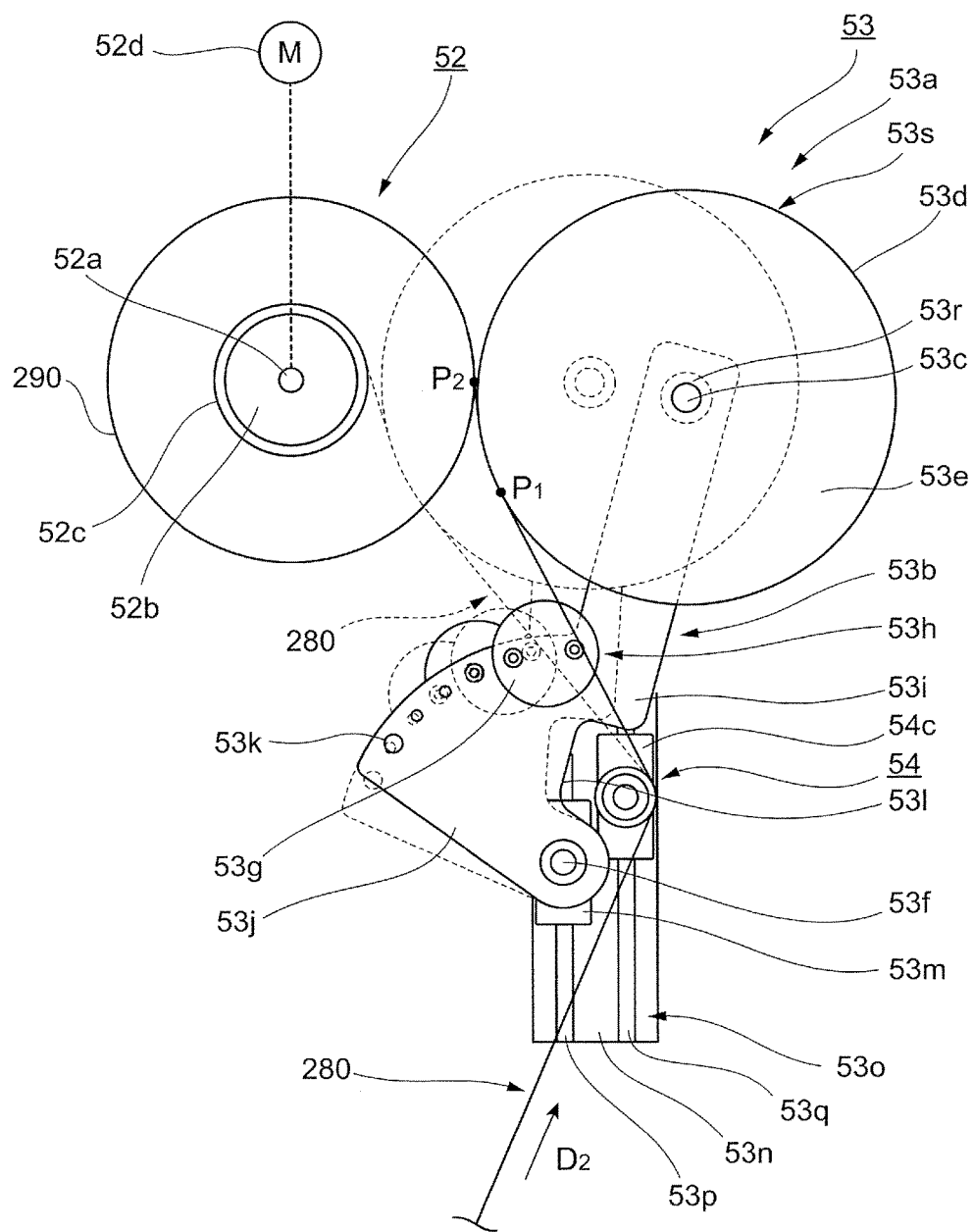
FIG. 6 is a diagram showing a change in a position of a guide roll part due to an increase of a radius of a residue roll wound by the winding unit in the exemplary embodiment.

Note that FIG. 6 is a diagram showing a change in the position of the guide roll part 53a due to an increase of a radius r of the residue roll 290 wound by the winding unit 52 in the exemplary embodiment. FIG. 7 is a diagram showing a change in guide unit pressure P, which is pressure applied to the residue roll 290 from the guide roll part 53a due to an increase of a radius r of the residue roll 290 wound by the winding unit 52 in the exemplary embodiment.

<Formation of Residue Roll 290>

The paper core 52c secured to the outer circumference of the winding roll shaft 52a is rotated due to the drive of the motor 52d upon receiving the rotation control signal from the controller 100.

At this time, the residue 280 adhered to the paper core 52c receives a continuous tensile force by the rotation of the paper core 52c, and is continuously peeled off from the label base material 200.

Here, before being wound by the paper core 52c, the residue 280 having been peeled off is wrapped around the angle adjusting roll main body 54b of the angle adjusting unit 54. Consequently, the residue 280 is transported toward the winding unit 52 while receiving the tension.

Moreover, the residue 280 receives a pressing force, due to the paper core 52c, from the guide unit 53 that is positioned on an upstream side and accordingly, the residue 280 is transported to the guide unit 53 in a state being pressed and flattened along the surface of the guide roll main body 53d.

Then, the residue 280 having been pressed and flattened is wound around the paper core 52c. As shown in FIG. 6, the wound residue 280 forms the residue roll 290, which is an example of a wound body, around the outer circumference of the paper core 52c.

In the exemplary embodiment, the attitude of the residue 280 just before being wound around the paper core 52c is corrected by the guide roll main body 53d.

Here, as described with reference to FIG. 3E, the residue 280 has a shape including cutting in the width direction (the FS direction in the figure). When tension is applied to the residue 280 including cutting in this manner, for example, extension in each portion of the residue 280 can be uneven. Consequently, for example, it can be considered that wrinkles extending in the longitudinal direction in the residue 280 are formed. However, since the residue 280 is pressed against the surface of the guide roll main body 53d, the residue 280 receives a force in a direction preventing the wrinkles.

Note that, for example, if the residue 280 in which wrinkles occur is wound by the winding unit 52, asperities can occur on the outer circumferential surface of the residue roll 290. Then, if the residue 280 is further wound around the outer circumferential surface of the residue roll 290 on which the asperities are present, there is a possibility, for example, that eccentricity of the whole residue roll 290 occurs, or the asperities on the outer circumferential surface become larger.

Further, if the eccentricity or the asperities become larger, there is a possibility that a load in the driving force from the motor 52d of the winding unit 52 is increased to an excessive degree and the winding unit 52 is stopped.

<Operations of Guide Unit 53>

If the residue 280 is continuously wound, the residue roll 290 increases winding radius thereof and gains weight. Due to increase of the weight, the load of the motor 52d for rotating the winding unit 52 is increased.

In the exemplary embodiment, as shown in FIG. 6, while pressing the residue 280 by the weight 53g, the guide unit 53 is separated from the winding unit 52 as the winding radius of the residue roll 29 is increased.

Figure 7:
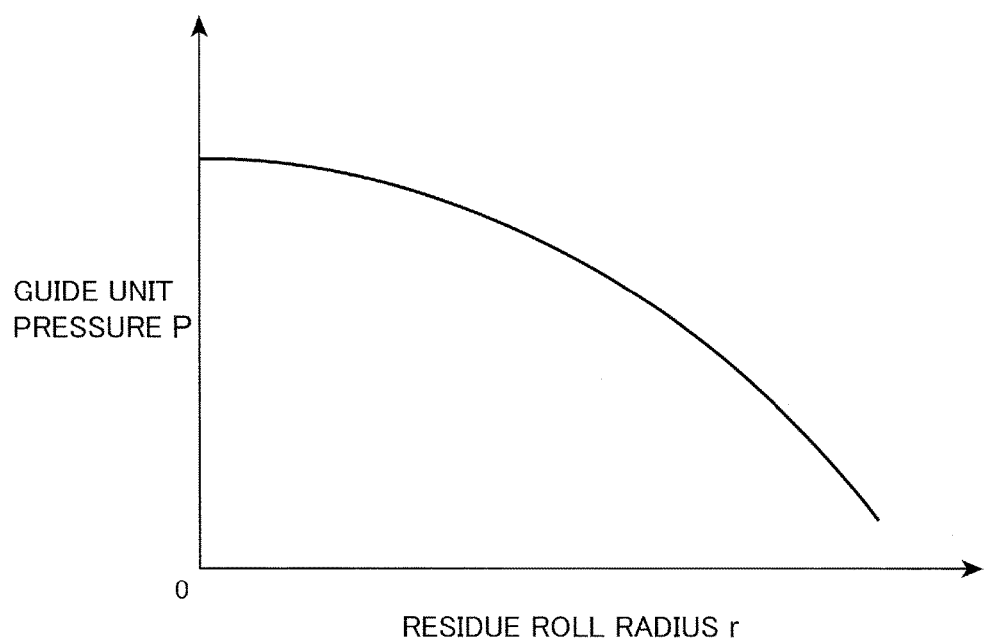
FIG. 7 is a diagram showing a change in pressure applied to the residue roll from the guide roll part due to an increase of a radius of a residue roll wound by the winding unit in the exemplary embodiment.

Due to the separation, the guide unit pressure P is reduced as shown in FIG. 7. In other words, though the weight of the weight 53g is constant, the guide unit pressure P is reduced. This reduces the load of the motor 52d. Note that, in the specific example shown in the figure, the guide unit pressure P is reduced as the residue roll radius r becomes large. To describe further, as the residue roll radius r becomes large, the reduction amount of the guide unit pressure P is increased.

Here, the position of the weight 53g is set above the support body shaft 53f of the guide unit 53. Moreover, when the guide unit 53 is separated from the winding unit 52, the weight 53g rotates around the support body shaft 53f as a rotational center. With the rotation, for example, relative to the support body shaft 53f, the position of gravity of the guide unit 53 moves from the horizontal direction side toward the vertical direction side. When the position of gravity of the guide unit 53 moves to the vertical direction side, the rotating force of the guide unit 53, namely, the force acting on the winding unit 52 side (the pressing force) is reduced.

From this, the position of the weight 53g is adjusted such that, in the step of starting to wind, the pressing force is sufficiently strong to prevent the asperities on the residue roll 29 from occurring, and in the step of finishing to wind, the pressing force is weak to allow the residue roll 290 to be rotated even if the asperities occur.

<Replacing Step>

Next, with reference to FIG. 6, operations in the replacing step of the paper core 52c in the exemplary embodiment will be described.

<Replacement of Paper Core 52c>

When the residue 280 of a predetermined amount is wound around the paper core 52c, the label printing apparatus 1 is stopped. With the stopping of the label printing apparatus 1, the residue wind-up part 50 is stopped. Then, for example, after cutting the residue 280 near the residue roll 290, the paper core 52c is removed from the free end side of the winding roll shaft 52a together with the residue roll 290. Then, a new paper core 52c is attached to the winding roll main body 52b. Thereafter, by carrying out the above-described preparation step, winding operation is restarted.

Note that, for detecting the amount of residue 280 wound around the paper core 52c, well-known techniques can be applied. For example, it may be possible to provide a sensor to detect the position of the outer circumferential surface of the residue roll 290 or to provide a timer to measure the elapsed time since winding by the residue roll 290 has been started.

<Modified Example>

In the above, the description has been given with respect the through holes 281 in the residue 280 with the same pitch and with the same shape; however, the pitches or shapes in the respective through holes 281 may be different. Moreover, though the through holes 281 have been described here, it is only necessary to be non-continuous portions formed in the residue 280, and, for example, the portions may be cuttings or cutouts. Note that, here, the description has been given such that the shape of the through holes 281 is substantially a rectangle; however, the shape may be other than the rectangular shape, such as a circular shape, an elliptic shape or a polygonal shape.

Moreover, in the specific example shown in FIGS. 5 and 6, the description has been given with respect to the position P1 where the guide unit 53 presses the residue 280 being on the upstream side of the position P2 where the residue 280 is adhered to the winding unit 52; however, the position P1 where the guide unit 53 presses the residue 280 may be on a downstream side of the position P2 where the residue 280 is adhered to the winding unit 52. In other words, the configuration may be such that the outer circumferential surface of the residue roll 290 is pressed after the residue 280 is wound around the residue roll 290.

Moreover, in the specific example shown in the figures, the description has been given with respect to the winding roll main body 52b of the winding unit 52 being a cylindrical shape; however, the winding roll main body 52b is not limited to the cylindrical shape, and may be in a cubic shape or other polygonal shapes. Further, the winding roll main body 52b is not limited to a hollow member such as the cylindrical member, and may be a skeletal frame body with no circumferential surface.

Moreover, in the specific example shown in the figures, the description has been given with respect to the guide roll main body 53b of the guide unit 53 being a cylindrical shape; however, the guide roll main body 53b is not limited to the cylindrical shape, and may be in part of a column, a cubic shape a rectangular shape or the like, as long as being a configuration capable of pressing and flattening the residue 280.

Moreover, in the specific example shown in the figures, the description has been given such that the guide roll main body 53d of the guide unit 53 is rotated to follow the winding roll main body 52b of the winding roll 52; however, it may be possible to provide a configuration in which the guide roll main body 53d is secured, or a configuration in which the guide unit 53 includes a driving source (not shown) to drive the guide roll main body 53d.

Moreover, in the specific example shown in the figures, the description has been given such that the winding unit 52 is secured and the guide unit 53 swings; however, it may be possible to provide a configuration in which the guide unit 53 is secured and the winding unit 52 swings.

Moreover, in the specific example shown in the figures, the description has been given with respect to the pressing force being varied in accordance with swinging of the support body arm 53h; however, another configuration, such as a spring or a motor, may be employed in place of the weight 53g as long as variation in the pressing force is possible.

Moreover, in the specific example shown in the figures, the description has been given assuming the configuration in which a single angle adjusting unit 54 is employed; however, it may be possible to provide a configuration in which plural angle adjusting units are employed. Moreover, a configuration without including the angle adjusting unit may be possible.

Moreover, in the specific example shown in the figures, the description has been given with respect to the forwarding roll 11 of the forwarding unit 10 including the motor; however, it may be possible to provide a configuration in which only the winding roll 81 of the wind-up part 80 includes a motor, or both of the forwarding roll 11 and the winding roll 81 include respective motors.

Moreover, in the specific example shown in the figures, the description has been given with respect to the residue

280 as a continuous sheet; however, a cut sheet is also applicable if a suction belt or the like is employed in the residue wind-up part 50.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A winding device comprising:
    a separation unit having a component that separates sheets layered and simultaneously transported;
    a winding unit having a component that winds one of the sheets separated by the separation unit; and
    a pressure contact unit having a component that presses the one of the sheets, before arriving at the winding unit, from outside of the one of the sheets wound by the winding unit, the pressure contact unit including a guide roll part and a support body part, the support body part supporting the guide roll part so that the guide roll part is displaceable,
    wherein the support body part includes a support body arm, a support body shaft that serves as a rotational center of the support body arm, a weight capable of adjusting its position with respect to the support body arm, and a securing part that is capable of securing the support body shaft to a housing of an apparatus having the winding device.

2. The winding device according to claim 1, further comprising an upstream side pressure contact unit that is provided on an upstream side of the pressure contact unit and has a component to press the one of the sheets from a side opposite to a surface of the one of the sheets pressed by the pressure contact unit.

3. The winding device according to claim 1, wherein the pressure contact unit is capable of moving away from a rotational center of the winding unit as a wound body of the one of the sheets wound by the winding unit increases in size with rotation of the winding unit.

4. The winding device according to claim 1, wherein the pressure contact unit is capable of adjusting pressure to be applied to the one of the sheets as a wound body of the one of the sheets wound by the winding unit increases in size due to rotation of the winding unit.

5. The winding device according to claim 1, wherein a position on the one of the sheets pressed by the pressure contact unit is provided on an upstream side of a position where the winding unit starts to wind the one of the sheets.

6. The winding device according to claim 1, wherein the layered sheets include a base sheet and a seal sheet that is layered on the base sheet via an adhesive, the seal sheet having an image formation surface, on which an image is formed, on a surface opposite to the adhesive.

7. The winding device according to claim 6, wherein the pressure contact unit presses the seal sheet from a side of the image formation surface of the seal sheet.

8. The winding device according to claim 1, wherein at least one of a through hole and a cutting is formed in the one of the sheets.

9. A label printing apparatus comprising:
    a forwarding unit having a component that forwards a two-ply sheet including a base sheet and a seal sheet layered on the base sheet via an adhesive;
    an image forming unit having a component that forms a print image on a surface of the seal sheet of the two-ply sheet forwarded by the forwarding unit;
    a lamination unit having a component that laminates a film on the surface of the seal sheet on which the print image is formed by the image forming unit;
    a punching unit having a component that punches a predetermined shape in the two-ply sheet on which the film is laminated by the lamination unit to form a label; and
    a label-excluding portion winding unit having a component that winds a label-excluding portion, which is a portion other than the label, from the two-ply sheet in which the label is punched by the punching unit, wherein
    the label-excluding portion winding unit comprising:
        a separation section having a component that separates the label-excluding portion from the two-ply sheet;
        a winding body having a component that winds the label-excluding portion separated by the separation section; and
        a pressure contact section having a component that presses the label-excluding portion, before arriving at the winding body, toward the label-excluding portion winding unit, the pressure contact unit including a guide roll part and a support body part, the support body part supporting the guide roll part so that the guide roll part is displaceable,
    wherein the support body part includes a support body arm, a support body shaft that serves as a rotational center of the support body arm, a weight capable of adjusting its position with respect to the support body arm, and a securing part that is capable of securing the support body shaft to a housing of an apparatus having the label-excluding portion winding unit.

\* \* \* \* \*